United States Patent [19]

Smith, Jr.

[11] Patent Number: 4,797,974
[45] Date of Patent: Jan. 17, 1989

[54] FISH FILLET RETAINER DEVICE

[76] Inventor: Jesse E. Smith, Jr., J & J Special Springs, P.O. Box 520, Waynesville, Ohio 45068

[21] Appl. No.: 114,728

[22] Filed: Oct. 30, 1987

[51] Int. Cl.⁴ ............................................. A22C 25/06
[52] U.S. Cl. ............................................. 17/45; 17/66; 17/70
[58] Field of Search ............................ 17/66, 70

[56] References Cited

U.S. PATENT DOCUMENTS

| | | |
|---|---|---|
| 1,006,367 | 10/1911 | Dittmar . |
| 1,228,366 | 5/1917 | Mills ............................ 17/70 |
| 2,178,019 | 10/1939 | Knuteson . |
| 2,496,062 | 1/1950 | Morfesi . |
| 2,895,139 | 7/1959 | Compton . |
| 3,048,884 | 8/1962 | Robichaux . |
| 3,181,198 | 5/1965 | Stelzen . |
| 4,615,078 | 10/1986 | Teich . |
| 4,682,813 | 7/1987 | Andrews ............................ 17/70 X |

*Primary Examiner*—Willie G. Abercrombie
*Attorney, Agent, or Firm*—Jacox & Meckstroth

[57] ABSTRACT

A device for manually retaining a fish during filleting the fish. A piece of material, such as metal or plastics or the like, is formed into a band which is adapted to encompass a person's finger. A stem extends from the band. At the end of the stem is a pointed protuberance which is adapted to engage a part of a fish while an instrument, such as a knife, engages another part of the fish.

7 Claims, 1 Drawing Sheet

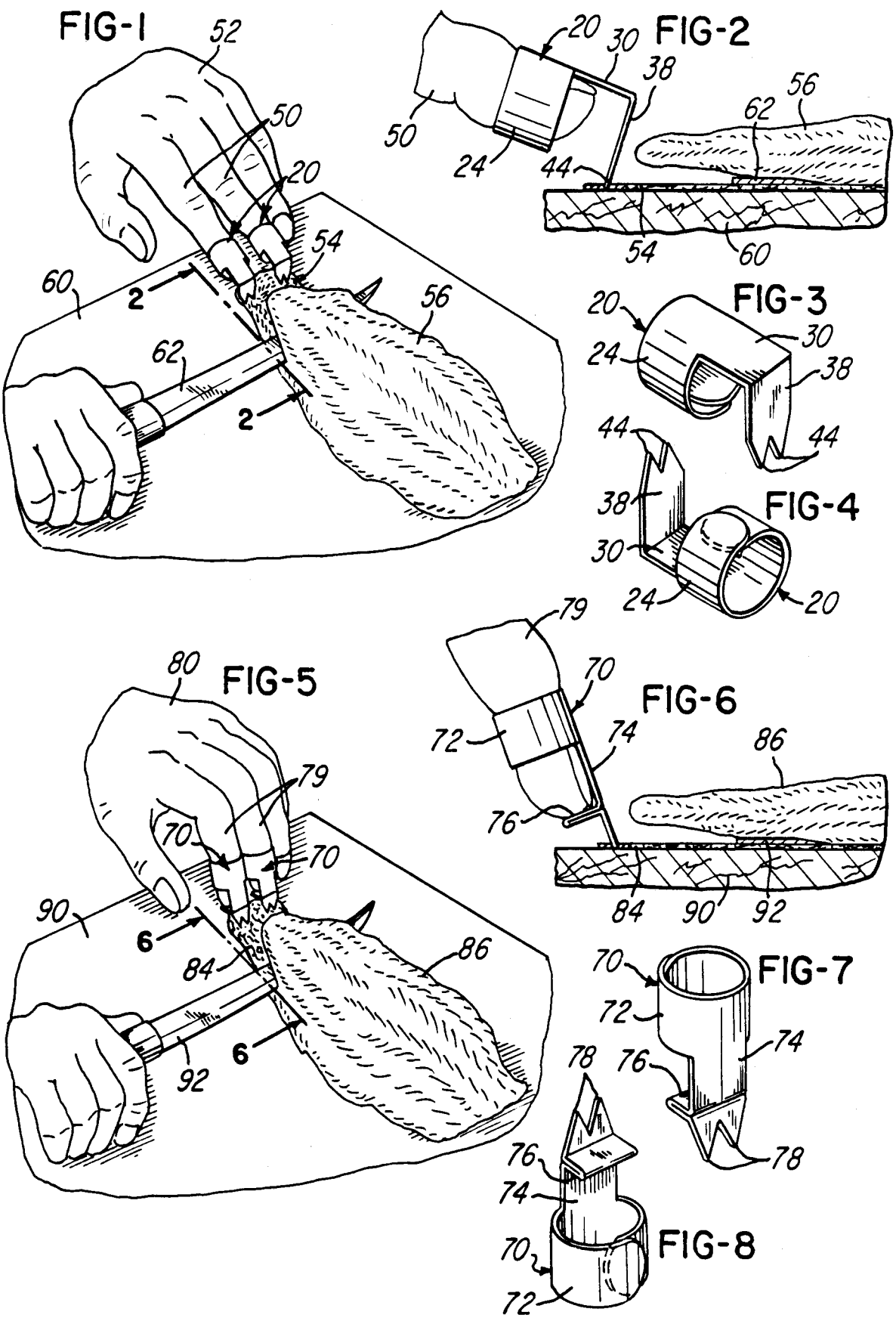

FISH FILLET RETAINER DEVICE

BACKGROUND OF THE INVENTION

In order to fillet a fish it is necessary to retain a small part of the fish while a knife is moved through a main body portion of the fish.

It is an object of this invention to provide a device by which a fish can be firmly retained while a knife is moved through the fish in a fillet operation.

It is another object of this invention to provide such a device by which a person's fingers are protected as a fish is retained by the fingers and as a knife is moved through the fish.

Another object of this invention is to provide such a device which can be easily and readily applied to a person's fingers for use by that person in filleting a fish.

Another object of this invention is to provide such a retainer device which can be produced at relatively low costs.

Other objects and advantages of this invention reside in the construction of parts, the combination thereof, the method of production and the mode of use, as will become more apparent from the following description.

SUMMARY OF THE INVENTION

A retainer device of this invention comprises a band which encompasses the end portion of a person's finger. Extending outwardly from the band is a stem. At the end of the stem is one or more pointed protuberances. Thus, a person who has the device at the end of a finger can retain a fish as a knife or other instrument is applied to the body of the fish.

BRIEF DESCRIPTION OF THE VIEWS OF THE DRAWING

FIG. 1 is a perspective view illustrating use of two retainer devices of this invention during a fillet operation upon a fish.

FIG. 2 is an enlarged sectional view taken substantially on line 2—2 of FIG. 1.

FIG. 3 is a top perspective view, drawn on substantially the same scale as FIG. 2, of a retainer device of this invention.

FIG. 4 is a bottom perspective view, drawn on substantially the same scale as FIG. 3, of a retainer device of this invention.

FIG. 5 is a perspective view, similar to FIG. 1, and drawn on substantially the same scale as FIG. 1, illustrating use of two other retainer devices, constructed in accordance with this invention.

FIG. 6 is an enlarged sectional view, taken substantially on line 6—6 of FIG. 5 and drawn on substantially the same scale as FIG. 2.

FIG. 7 is a perspective view, drawn on substantially the same scale as FIG. 6, showing a retainer device of FIGS. 5 and 6.

FIG. 8 is another perspective view of the retainer device of FIG. 7 and drawn on substantially the same scale as FIG. 7.

DETAILED DESCRIPTION OF THE INVENTION

FIGS. 3 and 4 show in detail a retainer device 20 of this invention. The retainer device is preferably made of a piece of sheet material, such as metal or plastics or the like, which is formed into a desired shape. As an alternative, a device of this invention may be molded as a single piece. The retainer device 20 includes a band 24, which is shown herein as being annular. Preferably, but not necessarily, as shown, the band 24 comprises two overlapping portions which are relatively adjustable to permit the band 24 to encompass fingers of various sizes. Extending from the band 24 is a stem 30. The stem 30 is shown as extending from the band 24 in a direction parallel to the central axis of the band 24.

Extending from the stem 30 at an angle thereto is a tab 38. At the end of the tab 38 is a pair of pointed projections 44.

In the use of a retainer device 20 of this invention the retainer device 20 is positioned upon a person's finger 50, with the band 24 encompassing the end of the finger 50, as illustrated in FIGS. 1 and 2.

FIG. 1 shows two devices 20, there being a device 20 upon each of two fingers 50 of a hand 52. As shown in FIGS. 1 and 2, the pointed projections 44 of the devices 20 are pressed into a portion 54 of a fish 56 to retain the portion 54 upon a cutting block 60. Then a knife 62 is forced through the fish 56 to fillet the fish 56.

Thus, it is understood that a retainer device 20 of this invention constitutes means by which a fish can be readily and easily retained during a fillet operation. By means of a retainer device of this invention a person's fingers are protected while the person's fingers retain a fish during cutting of the fish.

FIGS. 5-8

FIGS. 5-8 illustrate a retainer device 70 of this invention. The retainer device 70 includes a band 72. Extending from the band 72 is a stem 74. The stem 74 has an abutment portion 76. Extending from the stem 74 are two pointed projections 78.

The band 72 is adapted to encompass the end of a person's fingers, as illustrated in FIGS. 5 and 6. FIG. 5 shows two retainer devices 70, there being a retainer device 70 carried by each of two fingers 79 of a hand 80. Preferably, but not necessarily, the band 72 is constructed of two relatively adjustable flap portions, so that the band 72 can be adjusted to permit a person's finger 79 to slidably move through the band 72 and to engage the abutment portion 76 of the stem 74, as best illustrated in FIG. 6. The pointed projections 78 are forced into a portion 84 of a fish 86 to retain the portion 84 upon a cutting block 90. The end of the person's finger 79 upon the abutment portion 76 permits the finger 79 to apply significant downward pressure upon the portion 84 of the fish 86. Then a knife 92 is forced into the fish 86 to fillet the fish 86, as illustrated in FIGS. 5 and 6.

A retainer device 20 or 70 of this invention is relatively inexpensive to produce and is easily mounted upon a person's finger. The retainer device of this invention provides means by which a person's fingers can firmly and safely retain a fish while cutting the fish.

Although the preferred embodiment of the fish fillet retainer device of this invention has been described, it will be understood that within the purview of this invention various changes may be made in the form, details, proportion and arrangement of parts, the combination thereof, the method of construction and the mode of use which generally stated consist in a structure and method within the scope of the appended claims.

The invention having thus been described, the following is claimed:

1. A fish retainer device for filleting fish, the retainer device being adapted to be carried by a finger of a person's hand, comprising an annular band having an inside dimension substantially equal to the transverse dimension of a finger of a person's hand, the band having a central axis, a stem attached to the band and having a portion extending longitudinally from the band and parallel to the central axis of the band, a pointed projection extending from the stem and within a plane parallel to the central axis of the band, the pointed projection being engageable with a fish during filleting of the fish as pressure is applied upon the fish through the stem by a finger which is encompassed by the band.

2. The fish retainer device of claim 1 in which the pointed projection is at an angle with respect to the central axis of the band.

3. The fish retainer device of claim 1 in which the pointed projection is substantially parallel to the central axis of the band.

4. The fish retainer device of claim 1 in which the portion of the stem which extends longitudinally from the band includes an abutment portion which is angular with respect to the central axis of the band but through which the central axis of the band extends, the abutment portion being engageable by a finger which is encompassed by the band for applying pressure upon the fish.

5. The method of producing a fish retainer device which is adapted to be supported by a finger of a person's hand comprising forming a piece of sheet material, providing the piece of sheet material with a longitudinal central axis, forming a pair of flap portions which extend in opposed directions from the longitudinal central axis, forming a stem which extends from the flap portions and along the longitudinal central axis, forming a point in the end portion of the stem, and bending the flap portions one toward the other to form a substantially annular band which has a dimension substantially equal to the transverse dimension of a finger of a person's hand, with the band having a central axis parallel to the longitudinal central axis of the piece of material.

6. The method of claim 5 which includes bending the stem so that the stem has a part which is angular with respect to the central axis of the band.

7. The method of claim 5 which includes bending the stem so that the stem has a part which is angular with respect to the central axis of the band and in which the part forms an abutment for engagement by a finger which is encompassed by the band.

* * * * *